United States Patent Office 3,018,224
Patented Jan. 23, 1962

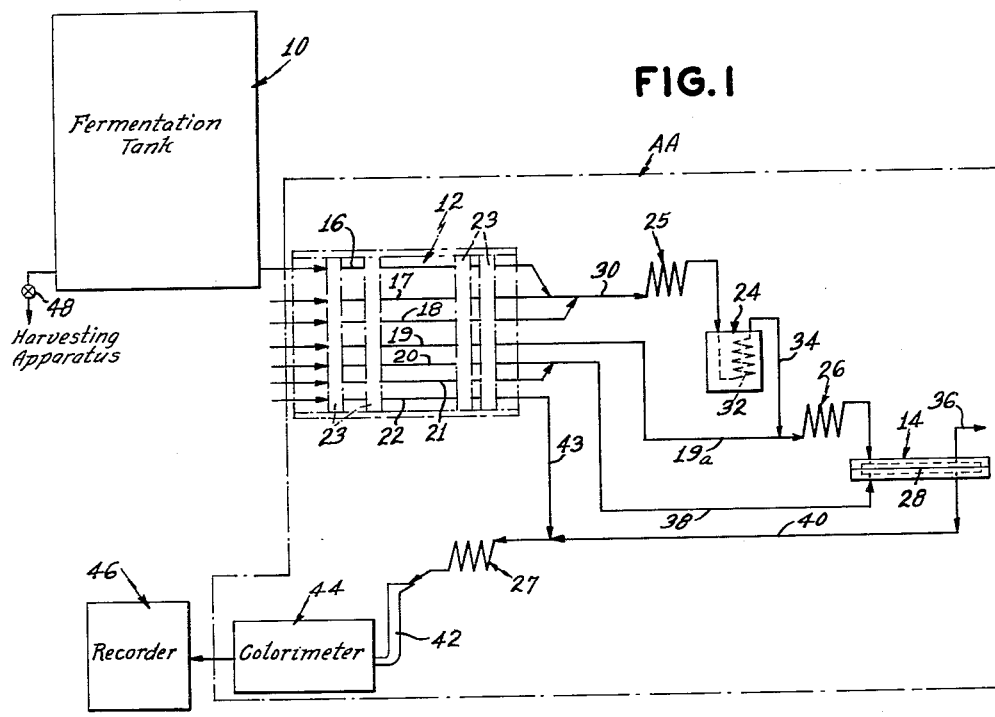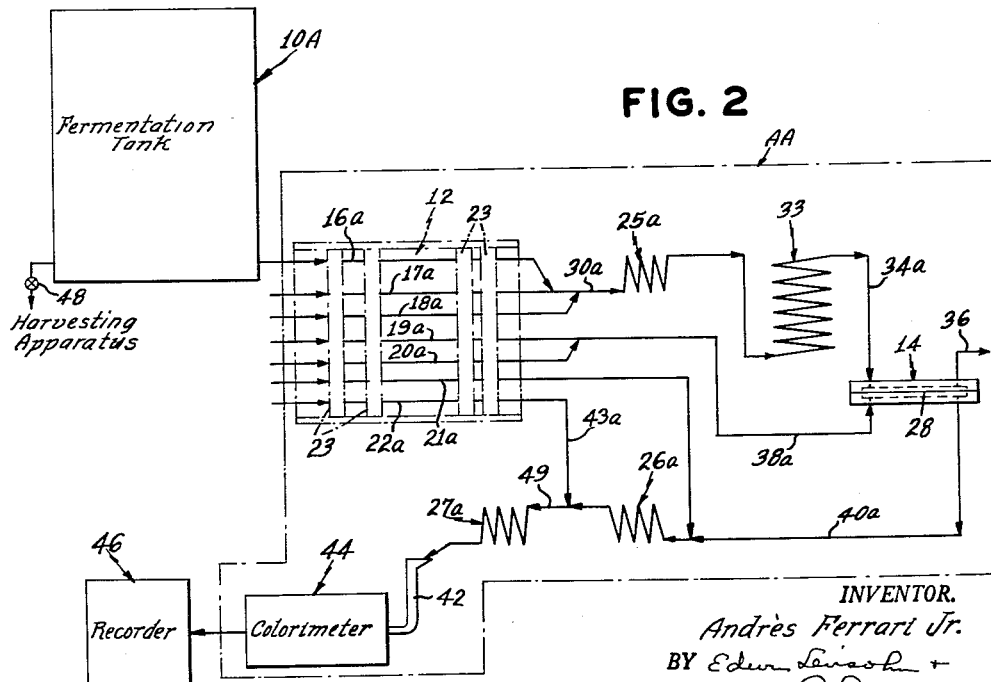

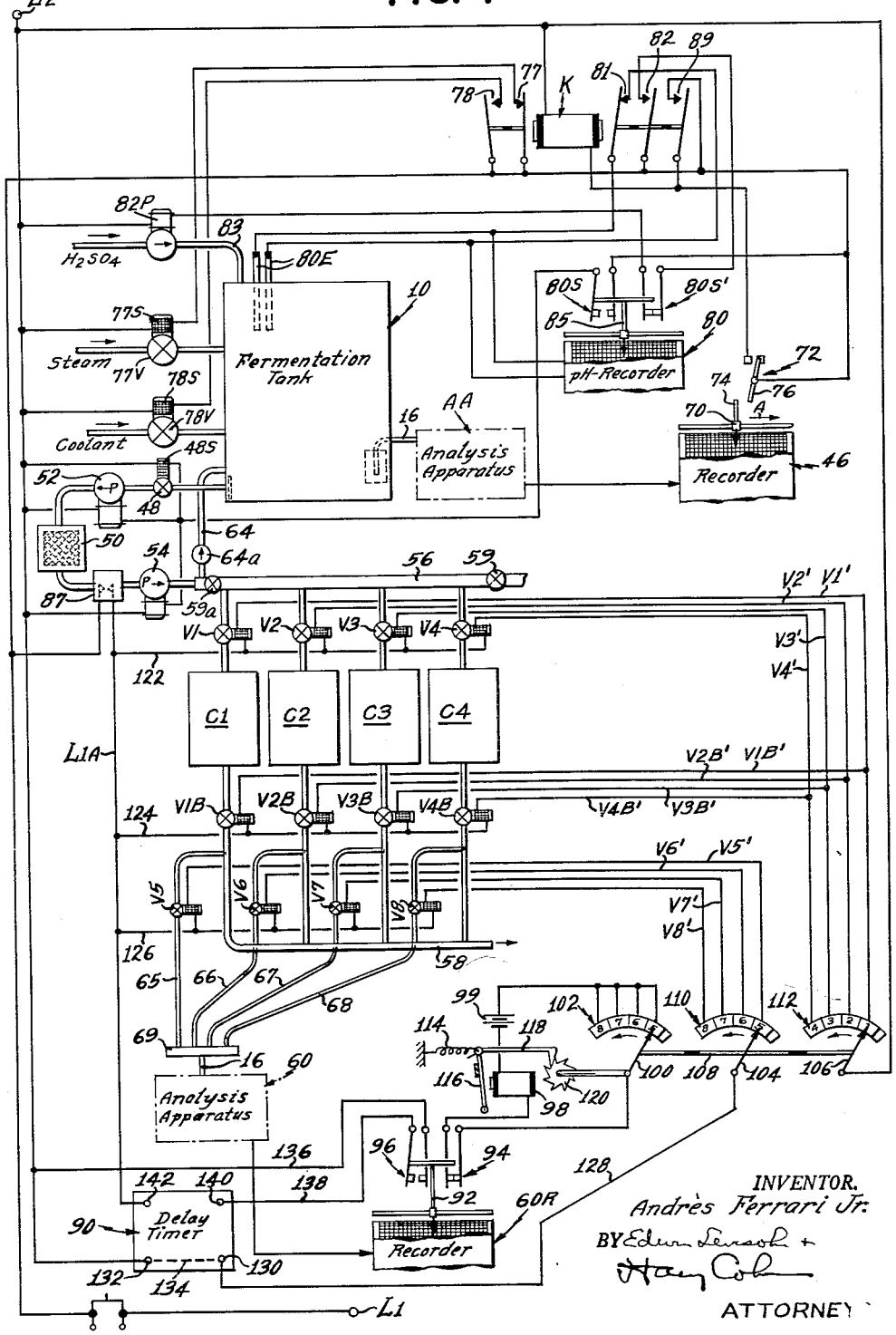

3,018,224
ANALYSIS AND PRODUCTION-MONITORING
METHODS AND APPARATUS
Andrés Ferrari, Jr., Scarsdale, N.Y., assignor, by mesne assignments, to Technicon Instruments Corporation, Chauncey, N.Y., a corporation of New York
Filed Aug. 23, 1957, Ser. No. 679,977
36 Claims. (Cl. 195—103.5)

This invention relates to the monitoring and control of the production of antibiotic substances.

In the commercial production of streptomycin and penicillin, or other antibiotics, which are produced in a nutrient broth in which the yield of the antibiotic reaches a maximum and thereafter may decrease if the antibiotic substance is not removed, it is important to ascertain as nearly as possible when the maximum yield point is reached. It is also important to ascertain periodically during the period of production whether or not the growth of the antibiotic is proceeding normally. For these purposes, it is the practice to analyze a series of samples of material taken from the fermentor tank periodically during the production period. These analyses not only require the work of several chemists or technicians but, even more importantly, each analysis takes a lot of time. Especially because of the time required for the analysis of a single sample, it sometimes happens that the optimum growth point is passed and rapid loss of the grown antibiotic, by counteraction of substances produced in the fermentor tank if the process is permitted to continue too long, sets in before the analysis is completed. Also, when the optimum growth point is reached, as indicated by the analysis, it is desirable to interrupt the operation by discontinuing the heating of the material in the fermentor tank and also by cooling the material if necessary for that purpose.

The invention also relates more generally to the monitoring of various fluids, including waste and other liquids in various phases of chemical and other processes and operations not only in the field of antibiotics but also in other fields as well.

It is not only necessary to carefully monitor the culture phase but also the harvesting phase of antibiotic production. More particularly, upon completion of the culture phase, the antibiotic is harvested by pumping the material from the culture tank through a filter press and then through a column in which the antibiotic is adsorbed and thus removed from the liquid which is then discharged to waste. The harvesting operation involves the use of a series of ion-exchange resin or other adsorption columns for a single culture tank, the material from the tank being fed first to one column until the latter has adsorbed its maximum quantity of the antibiotic and then the supply from the tank is transferred to the next column, and so on, until all of the antibiotic from the culture tank is harvested. It is obvious, therefore, that it is important to monitor the waste liquid, discharged from the column, in order to ascertain whether it contains an appreciable quantity of antibiotic, for if the analysis is positive, it indicates that the maximum adsorption capacity of the column is exceeded and antibiotic material which should be harvested is going to waste with the liquid discharged from the column. The analyses required for this purpose being essentially of the same character as those conducted during the culture phase, give rise to a problem similar to that attending the culture phase, for it is necessary, in order to prevent waste in the discharge from a particular harvesting column, to be able to ascertain quickly the quantity of antibiotic present in the waste liquid being discharged from the column.

The present invention eliminates the above-mentioned serious disadvantages and difficulties encountered in the commercial production of antibiotics. Specifically, in accordance with this invention, it is possible to obtain almost instantly and, if desired, continuously a quantitative indication of the antibiotic in the culture tank at any time during the culture phase; and it is similarly possible to monitor the waste liquid discharged from each harvesting column.

The provision for accomplishing these results constitutes one of the objects of this invention.

Another object is to provide for automatically discharging the antibiotic containing liquid from the culture tank at the optimum yield point into the harvesting columns.

A further object is to provide for automatically terminating the supply of the antibiotic containing liquid to a harvesting column when the optimum adsorptive capacity of the latter is exceeded and to thereupon automatically transfer the supply from the culture tank to the next harvesting column.

The above and other objects, features and advantages of the present invention will be more fully understood from the following description considered in connection with the accompanying illustrative drawings.

In the drawings:

FIG. 1 is a flow diagram illustrating the invention in connection with production of streptomycin;

FIG. 2 is a view similar to FIG. 1 illustrating the invention with reference to the production of penicillin;

FIG. 4 is an illustration, partly diagrammatic, of automatically operable apparatus for completing the culture phase and for performing the harvesting operation.

Figure 3:
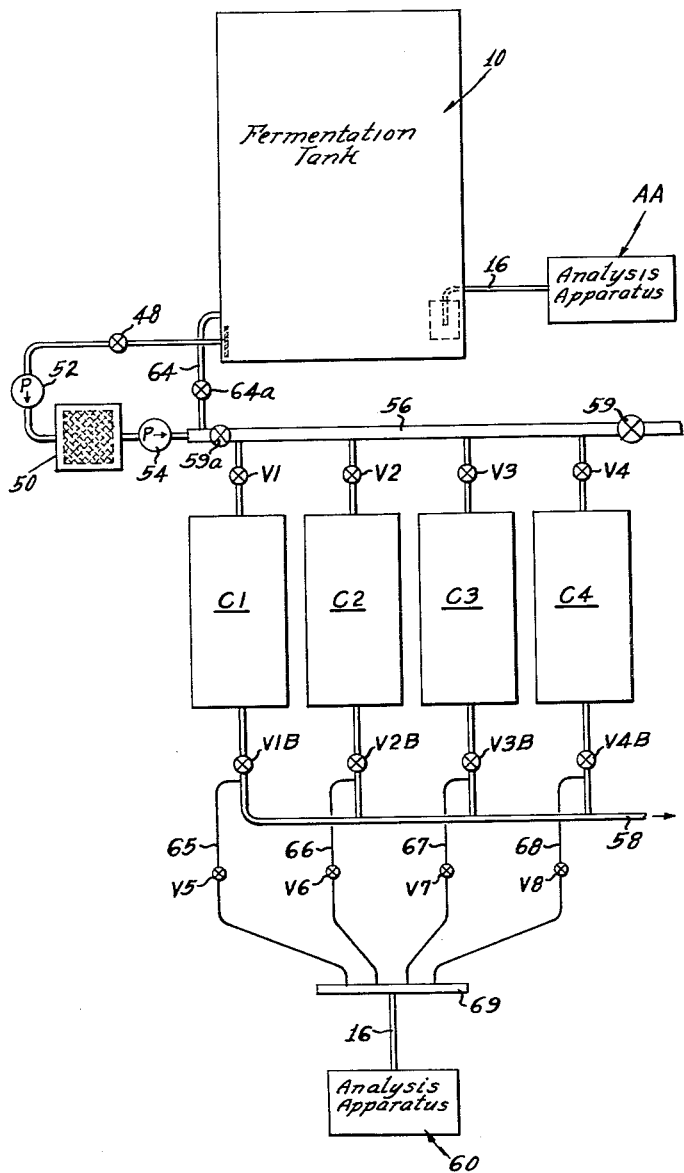
FIG. 3 is an illustration, partly diagrammatic, of the invention when employed in connection with the harvesting of the antibiotic material.

Analysis for streptomycin requires that the sample be treated with sodium hydroxide to convert, by hydrolysis, the streptomycin into maltol (2-methyl-3-hydroxy-y-pyrone), one part of streptomycin being represented by one part of maltol. Heretofore, numerous operations and manual manipulations and the use of many receptacles and devices were required in order to prepare the sample liquid for analysis and to perform the analysis. The following procedure is typical, namely; first, a sample drawn from the fermentation tank is treated with an acid to release the streptomycin from the mycelia; then the sample is subjected to a gross filtration to remove large-sized material; then sodium hydroxide is added to the filtrate to hydrolyze the streptomycin and thereby convert it to maltol, this operation being performed at a temperature of about 95° C. in order to accomplish the hydrolization within a reasonable time; then sulphuric acid is added to neutralize excess sodium hydroxide; then the sample is passed through a fine filter to remove all non-dissolved substances and to obtain a clear filtrate; then this filtrate is distilled, three-phase distillation being employed in order to obtain a maximum quantity of purified maltol from the filtrate; then distillate is quantitatively analyzed, usually by colorimetric analysis, for its maltol content.

The above-mentioned tedious and time consuming operations are obviated by the present invention and even more importantly it is possible to obtain a continuous indication or record of the streptomycin content in the fermentation tank concurrently with the growth of the sreptomycin therein so that it is possible for the chemist or technician to be fully and accurately informed at all times of the progress of the quantity of streptomycin in the tank as well as whether the process is proceeding as it should.

Briefly described, in accordance with the method of the present invention, a sample stream of liquid from the fermentation or culture tank and a stream of sodium hydroxide are pumped through tubes, and while flowing are mixed and heated to convert the streptomycin to maltol, then a stream of acid is introduced into the stream of liquid containing the maltol in order to neutralize excess alkali in the maltol-containing liquid, and the resulting liquid is pumped through a dialyzer at one side of the membrane and is continuously discharged from the dialyzer at said side thereof. Simultaneously with the pumping of the maltol-containing liquid through one side of the dialyzer water or other suitable diffusate liquid is pumped through the dialyzer at the other side of said membrane thereof with the result that maltol diffuses through the membrane into the distilled water. The liquid containing the maltol diffused therein through the membrane flows from the dialyzer and, while in the form of a flowing stream, a color producing reagent, such as ferric chloride ($FeCl_3$), specific for maltol, is added to said stream of liquid and mixed therewith, and the liquid is transmitted through the flow cell of a colorimeter recorder.

As the quantity of maltol diffused through the membrane of the dialyzer is directly proportional to the quantity of maltol in the liquid which flows through the dialyzer at the first-mentioned side thereof, and as the proportion of maltol to streptomycin is one-to-one, the light absorption characteristic of the liquid flowing through the flow cell of the colorimeter, resulting from the addition of the ferric chloride employed in accordance with the present invention as the preferrd color producing reagent for the indication and determination of maltol, provides a quantitative indication of the streptomycin in the sample taken from the fermentation tank. As the method of the present invention may be performed either periodically or continuously, as desired, there is available to the chemist or technician means for substantially immediately ascertaining the quantity of streptomycin in the fermentation tank, so that as soon as the optimum yield point is reached, further or harmful action in the tank may be immediately discontinued by discontinuing the heating of the liquid in the tank and, the liquid containing the streptomycin may then be pumped from the tank, and harvested or if the culture phase is at, or is nearing, its end toward the end of the day, the tank can be cooled to interrupt the process until the following working day.

The invention will now be further described with reference first to FIG. 1 of the drawings which also illustrates more-or-less diagrammatically the apparatus employed pursuant to the present invention for carrying out the process. In FIG. 1, the fermentation tank which contains the nutrient broth for the growth of the streptomycin is indicated at 10. Said tank may be of any commonly used or suitable type and as usual may be provided with a heating coil and agitator or mixer and an aerator (not shown). The automatic analysis apparatus indicated generally by the reference character AA comprises a proportioning pump 12 for pumping the liquid sample and the other fluids in proportional amounts through the dialyzer indicated at 14 and through the auxiliary devices. The proportioning pump is preferably of the type disclosed and referred to in the United States application, Serial No. 644,309, filed March 6, 1957, by me and Edwin C. Whitehead, now Patent No. 2,899,280, and assigned to the assignee of the present application. Such a pump includes a plurality of resiliently compressible tubes of predetermined internal diameters for transmitting liquids or fluids in predetermined proportions. The resiliently compressible tubes are indicated by the reference numerals 16, 17, 18, 19, 20, 21, and 22, and members which are moved longitudinally of said tubes for progressively compressing them along their lengths are indicated by the numeral 23. A heater water bath or other suitable heater is indicated at 24, and mixing devices are indicated at 25, 26 and 27, there being a mixing device in each fluid line into which two or more different liquids are pumped for mixing said liquids thoroughly during the flow thereof through the apparatus. Each of said mixing devices is preferably in the form of a helical coil of tubing, mounted so that its longitudinal axis is horizontal, and said tubing is preferably formed of glass or other suitable transparent material, either in whole or in part, so that the flow of the fluids through said coils may be observed. The membrane of the dialyzer is indicated at 28 and divides the interior of the dialyzer into two compartments, so that the only substance which passes from one compartment to the other must be a substance which is capable of passing through the dialyzer membrane.

In the operation of the apparatus, the sample liquid is pumped from the tank 10 through the tube 16 and the sodium hydroxide is pumped through the tube 18, and the two liquids flow together through a tube 30 which is connected to the pump tube 17 through which air is simultaneously pumped and acts to divide the liquid flowing through tube 30 into a series of liquid segments spaced from each other by intervening segments of air as described and referred to in the above-mentioned application, Serial No. 644,309, now Patent No. 2,899,280. The sample liquid and sodium hydroxide are thoroughly mixed in the mixing coil 25, and the mixed liquids then flow through the coil 32 of the heater 24 where the liquid is heated to a temperature of about 95° C. As described above, the treatment of the sample liquid with the sodium hydroxide converts the streptomycin in the sample liquid, by hydrolization, to maltol, and thereafter sulphuric acid is added to the maltol-containing liquid in order to neutralize excess alkali which may be present in order to guard against interference with the colorimetric reaction which would occur if alkali were present. For example, if the liquid to which the ferric chloride is added should contain alkali, a precipitate of ferric hydroxide would be formed and this would nullify or seriously impair the action of the ferric chloride as a color reagent or indicator for maltol. The acid added to the maltol-containing liquid which flows from the heater coil 32 into the tube 34 is supplied through the tube 19 of the pump connecting tube 19a and mixes with the maltol-containing liquid in the mixing coil 26. From the latter, the maltol-containing liquid with the added acid passes in the form of a flow stream to the dialyzer 14 at one side of the diaphragm 28 thereof and is discharged to waste through the outlet tube 36. While the maltol-containing liquid is passing through the dialyzer at one side of the membrane, some of the maltol contained in said liquid diffuses through the membrane into the diluent, namely, the water supplied to the dialyzer at the other side of the membrane 28 by the tube 20 of the pump and the connecting tube 38. Air is introduced into the conducting tube 38 through the tube 21 of the pump and divides the fluid stream in tube 38 into segments of water separated by segments of air in the same manner as described above with reference to tubes 17 and 30. The liquid containing the maltol diffused therein through the membrane 28 of the dialyzer is discharged from the dialyzer into the tube 40, and ferric chloride is introduced into said liquid from the tube 22 of the pump by the connecting tube 43. These two liquids then flow through the mixing coil 27 and are thoroughly mixed therein and from the mixing coil the liquid containing the diffused maltol and the ferric chloride flows to the blending tube 42 in which the successive liquid segments blend with each other, with simultaneous discharge or venting of the air segments through the open top of said tube. It will be understood that in flowing through the dialyzer, which is preferably of the construction disclosed in the U.S. application, Serial No. 655,093, filed April 25, 1957, now Patent No. 2,864,507, the fluids follow a tortuous path in a tube-like conduit at each side of the membrane and that the fluid flowing in each of these conduits is in the form of a segmented stream made up of segments of liquid separated by segments of air introduced by the pump through tubes 17 and 21, respectively. The division of the liquid into segments by the introduction of the air into the conducting tubes and the flow of the air segments through the tubes improves operation of the apparatus and the use of this feature of the invention is advisable. From tube 42 the liquid passes through the flow cell of the colorimeter 44 for controlling the operation of the colorimeter recorder 46.

In accordance with the following illustrative example, the fluids are transmitted by the pump in the following proportions:

| Fluids | Tube Diameter in Inches | Rate of Flow in Mls. Per Minute |
| --- | --- | --- |
| Sample liquid from fermentation tank (tube 16) | .056 | 1.0 |
| Sodium hydroxide (.5 N) | .073 | 2.0 |
| Air (tube 17) | .045 | 0.7 |
| Sulphuric acid (3 N) | .045 | 0.7 |
| Ferric chloride (0.25%) | .065 | 1.5 |
| Water | .065 | 1.5 |
| Air (tube 21) | .056 | 1.0 |

In the above table, the values .5 N and 3 N indicate degrees of normality.

It will be readily understood that the pump 12 may be operated continuously during the culture phase or fermentation process in the tank 10 with consequent continuous operation of the analysis apparatus and the provision of a continuous record by the colorimeter recorder 46, or the apparatus may be operated at suitable intervals in accordance with the preference of the chemist or the technician. Also, it is apparent from the above description that when the reading on the recorder 46 indicates that the maximum yvield of streptomycin has been achieved, steps are taken to prevent further or harmful action in the tank and for that purpose the heating of the tank may be discontinued and, if necessary, the contents of the tank may be cooled. The harvesting operation is then performed. A valved delivery outlet for the liquid from the fermentation tank is indicated at 48. It will be understood that this liquid discharged from said tank may be treated in any suitable way, as heretofore, for harvesting the streptomycin.

The method of the present invention as applied to the product of a different antibiotic material, in this case, penicillin, will now be described with reference to FIG. 2 of the drawing. The apparatus is essentially the same as the apparatus illustrated in FIG. 1, except that the mixing coils are differently located in the several fluid lines, the heater is omitted, and a coil of tubing 33 is employed for providing a time delay in the flow of the penicillin-containing liquid and the added reagent to the dialyzer. For convenience in reference, in the description of the process, the fermentation tank is designated 10A, the mixing coils are indicated at 25a, 26a and 27a. The pump tubes are designated by the numerals 16a to 22a, respectively, and other tubes of the fluid lines are designated by the numerals 30a, 38a, 43a, and a tube between the two mixing coils 26a and 27a, to which the tube 43a is connected, is designated by the numeral 49.

In accordance with my invention, the analysis for penicillin involves the conversion of penicillin to penicilloic acid by treating the penicillin-containing liquid from the tank 10A with sodium hydroxide. As the proportion of penicilloic acid in the treated sample is the same as the proportion of penicillin in the sample prior to treatment, the quantitative analysis of the treated sample for penicilloic acid provides a quantitative indication of the penicillin in tank 10A. Accordingly, the sample liquid is pumped from the tank 10A through the tube 16a simultaneously with the pumping of NaOH through the tube 18a into the tube 30a to which the air supply tube 17a is also connected for forming the liquid and air segments as described above with reference to FIG. 1. The liquids are thoroughly mixed in the mixing coil 25a and then flow through the flow-delaying coil 33 in which the time of flow is sufficient, say five minutes or so, to enable the conversion of the penicillin to penicilloic acid to be completed. The liquid containing the penicilloic acid then flows through the dialyzer 14 at one side of the membrane 28 and discharges to waste through the outlet 36. In flowing through the dialyzer, some of the penicilloic acid in the stream of liquid diffuses through the membrane into the water, which flows into the dialyzer at the other side thereof, from the pump tube 19a and the connection 38a, and out of the dialyzer through the tube 40a. Air is introduced into the water by the pump tube 20a to form the segmented fluid stream.

Color is developed in the liquid flowing through tube 40a by adding iodine and a water solution of starch to said liquid. As here shown, the iodine is pumped through the tube 21a into the tube 40a and is mixed with the liquid from tube 40a in the mixing coil 26a, and the starch solution is introduced by the pump tube 22a and the connection 43a to the tube 49 which is connected between the mixing coils 26a and 27a. In the mixing coil 27a, a characteristic color indicative of the penicilloic acid is developed and the depth of the color, i.e., its degree of light absorption as determined by the colorimeter, is a measure of the quantity of penicilloic acid in the liquid, and this is a measure of the quantity of penicillin in the tank 10A as represented by the withdrawn sample pumped through tube 16a. The action of the iodine-starch reagent as a color indicant of the quantity of penicolloic acid results from the reduction of the iodine by said acid whereby the quantity of non-reduced iodine present in the liquid furnishes, when treated with starch, a quantitative indication of the penicilloic acid. As the reduction of iodine by pinicilloic acid does not occur unless the iodine is acidified, the iodine solution supplied to pump tube 21a is acidified and its preferred pH is 6.5. Instead of introducing the iodine and starch separately, they can be first mixed together and thereafter introduced into the liquid flowing from the dialyzer through tube 40a. However, the pump 12 and the mixing coils furnish a convenient and effective means for the addition of the iodine-starch color indicant and eliminate the separate mixing operation.

The following is an illustrative example of the proportions in which the fluids are pumped through the apparatus for penicillin analysis:

| Fluids | Tube Diameter in Inches | Rate of Flow in Mls. Per Minute |
| --- | --- | --- |
| Sample liquid from tank 10A | .056 | 1.0 |
| NaOH | .073 | 2.00 |
| Air (tube 17a) | .035 | 0.42 |
| Iodine | .065 | 1.5 |
| Starch solution | .065 | 1.5 |
| H₂O | .065 | 1.5 |
| Air (tube 20a) | .045 | 0.7 |

When the colorimeter recorder 46 shows that the quantity of penicillin in the fermentation tank 10A is about the maximum which can be obtained, heating is discontinued and the material in the tank 10A may be cooled, and the valve 48 is opened for delivery of the penicillin-containing liquid to the harvesting apparatus.

It will be noted that in conducting the above-described quantitative analysis in respect to the antibiotics grown in tanks 10 and 10A, the filtration and distillation operations required to be performed in accordance with prior art practices are eliminated, and either a running analysis or periodic analysis may be made and the results obtained almost instantaneously, in either case, so that delay in analysis, as in the prior art, is entirely eliminated. It may be noted further in this connection that in accordance with the present invention it is only necessary to provide a screen at the outlet from the tanks to tubes 16 or 16a to prevent the passage into said tubes of materials which might interfere with the free flow of liquid therethrough, and that the apparatus which includes the pump 12, the dialyzer 14 and the auxiliary devices utilized in conjunction therewith, as previously described, are automatically operative to accurately analyze the sample liquid drawn from the tanks and to indicate or record the analysis concurrently as the production of the antibiotic material proceeds.

As previously stated, the present invention not only makes it possible to monitor the culture phase but also the harvesting phase of the production of antibiotic materials, thus to eliminate waste in the harvesting operation as well as in the culture phase. This aspect of the invention will now be described with reference to FIG. 3 of the drawings. As here shown, the valved delivery conduit of the fermentation tank is connected to a filter press 50 through which the liquid is pumped by the pumps 52 and 54 to a manifold pipe 56 to which a plurality of adsorbent columns C1, C2, C3 and C4, for example, are connected by branch pipes controlled by the valves V1, V2, V3, V4, respectively. As heretofore, the several columns are provided with outlet pipes which lead to the waste discharge pipe, said outlet pipes being provided with the valves V1B, V2B, V3B, and V4B, respectively. In the known process of harvesting the antibiotic, the columns each comprises an adsorbent material such as an ion exchange resin in the case of streptomycin and adsorptive carbon in the case of penicillin. The liquid from the filter press flows through the first column C1, and when the latter has adsorbed the maximum quantity of antibiotics, according to the capacity of the column, the valves V1 and V1B are closed and the liquid from the tank is caused to pass through the next column C2 by closing valves V1 and V1B and opening valves V2 and V2B, and this procedure is followed in succession in the case of columns C2, C3 and C4. Valve 59 is normally closed, but may be opened when all of the valves V1 to V4 are closed and it is desired to discharge liquid from pipe 56 without passing through any of said columns. Valve 59a is normally open.

As previously indicated, it was not possible heretofore to determine accurately and promptly when the capacity of a particular adsorbent column had been exceeded and antibiotic material was being wasted through the discharge conduit 58, inasmuch as a single analysis as heretofore conducted took a long time. This difficulty and cause of great waste are eliminated by this invention. This is accomplished by analyzing the liquid passing through the outlet pipes of the respective adsorbent columns by the analysis apparatus illustrated by FIGS. 1 and 2, for streptomycin and penicillin, respectively. This apparatus, including the pump 12, the dialyzer 14, the colorimeter recorder 44, 46, and the auxiliary apparatus is designated by the diagrammatic block 60. Tubes 65, 66, 67 and 68 provided with the valves V5, V6, V7 and V8, respectively, are connected to a manifold pipe 69 and the latter may be connected to the pump tube 16 of the pump 12. In FIG. 3, all of the valves associated with the harvesting apparatus, except valves V1, V1B and V5 are closed; consequently, the liquid discharged from the fermentor tank will flow through adsorbent column C1, and a sample of the waste liquid discharged from said column through valve V1B will flow through the by-pass pipe provided with valve V5 and will be pumped through the analysis apparatus 60 and analyzed as described above. As long as the colorimeter recorder 60R indicates little or no antibiotic, the column C1 will be maintained in operation and the other columns will remain in inoperative and stand by condition. As soon as the colorimeter recorder indicates that the tolerable waste quantity of antibiotic is being exceeded, the technician will transfer the liquid flow from delivery pipe 56 to column C2 and for that purpose will close valves V1 and V1B and will open valves V2 and V2B, and at the same time he will place the waste from column C2 under analysis by closing valve V5 and opening valve V6. Similar operations will, of course, be carried out subsequently in the case of the operations of columns C3 and C4, respectively, when the colorimeter recorder indicates that the maximum adsorbent capacity of columns C2 and C3, respectively, are being exceeded.

As illustrated in FIG. 3, a by-pass pipe 64 is provided between conduit 56, near the outlet of pump 54, and the fermentation tank 10. Said by-pass pipe is provided with a pressure relief valve 64a which opens in a direction to allow liquid to be pumped back into the tank 10 in the event that conduit 56 should become clogged or if for some other reason the pressure in said conduit exceeds a predetermined amount. Pump 54 is preferably of the reciprocating piston type in order to provide a constant pressure supply of liquid to the harvesting column, and when, as here shown, two pumps are used, pump 52 is preferably of the centrifugal type in order to operate without interfering with the reciprocating pump 54.

In accordance with a further development of the present invention, provision may be made for automatically harvesting the antibiotic material when the colorimeter recorder indicates that a predetermined quantity of the antibiotic material has been produced in the fermentation tank. It will be understood, however, that the present invention as described above may be practiced to great advantage even without provision for the automatic harvesting of the material and without any other automatic operation other than the automatic analyses described above with reference to FIGS. 1 to 3 and, of course, the invention may be used either in connection with the culture phase in tank 10 or with the harvesting phase in connection with the adsorbent columns C1 to C4 of the production system or with both phases. However, in accordance with the preferred mode for the practice of the present invention, provision is made for the automatic operation which is about to be described, with reference to FIG. 4.

As in FIG. 3, the harvesting columns are designated C1 through C4 and the fermentation tank in which the antibiotic material is produced is designated by the numeral 10, and other various parts of the apparatus described above with reference to FIG. 3 and which are incorporated in the apparatus for automatic operation are designated by the same reference characters respectively. When the stylus 70 of the colorimeter recorder 46, moving in the direction of the arrow A, reaches a predetermined position corresponding to the optimum yield value of the antibiotic material in the fermentation tank 10, a normally open switch 72 is closed for energizing the relay K. It will be understood that the position of switch 72 may be adjusted along the path of movement of the arm 74 of the recorder stylus so that the switch arm 76 is actuated, as previously stated, when it has moved to the point at which the recorder stylus 70 indicates the optimum yield point. When relay K is energized, the normally closed contacts 77 of said relay are opened whereby the solenoid 77S of the solenoid valve 77V is de-energized and the valve closes automatically by operation of its closing spring for discontinuing the supply of the stream or other heating fluid to the heater of the tank 10, and if desired provision may be made as here shown for the supply of a coolant to the heater coil for cooling the material in the tank 10. For this latter purpose, the relay K is provided with a set of contacts 78 which are normally open and are closed when the relay K is energized for energizing the solenoid 78S of the valve 78V for opening the latter to provide for the passage of the coolant to the coil in tank 10.

At the time that the heating of tank 10 is discontinued, stylus 85 of the pH recorder 80, which may be of any known type, is placed in operation as a result of the opening of the normally closed contacts 81 of the relay K. More particularly, contacts 81 normally short circuit the pH electrodes 80E, and when the short circuit is removed when contacts 81 are opened the stylus of the pH recorder is placed under the control of said electrodes. Also, the paper-feed motor of said recorder may be placed in operation by providing relay K with a pair of normally open contacts which close when the relay is energized and complete a connection from a source of current to said motor. When relay K is energized, relay contacts 82 are closed and complete a circuit through the motor of pump 82P for pumping sulphuric acid through the pipe 83 into tank 10 for imparting the desired pH to said liquid in said tank. It will be understood that throughout the operation of the apparatus a stirrer (not shown) in the tank is in operation in order to provide constant stirring and mixing of the liquid in the tank. When the stylus 85 of the pH recorder 80 reaches the predetermined adjusted position of the switch contacts 80S, the latter are closed and close a circuit through the solenoid 48S of outlet valve 48 and at the same time close a circuit through the motors of pumps 52 and 54 for pumping the antibiotic-containing liquid from tank 10 through the filter press 50 and to the manifold pipe 56 of the harvesting columns C1 through C4. Holding contacts 89 are closed by the energization of relay K and provide a holding circuit for assuring that said relay will remain energized and the respective relay contacts closed or opened, as required, even though the stylus 70 of the analysis recorder 46 should move back from the position at which switch 72 is closed, as previously described. A normally closed switch 80S' is provided in series with the normally open switch 80S, which is closed by the stylus 85 of the pH recorder, in the line which controls the energization of the motor which operates the sulphuric acid pump 82P so that when the pH of the liquid in tank 10 exceeds a predetermined value the circuit through the motor of said pump is interrupted and the supply of sulphuric acid to tank 10 is discontinued.

As explained above with reference to FIG. 3, at the start of the harvesting operation, all of the valves controlling the passage of liquid to the harvesting columns and to the analysis apparatus 60 are closed except valves V1, V1B and V5 related to column C1, which are open so that liquid flows from the manifold 56 through the adsorbent in harvesting column C1 and then to waste through pipe 58 and so that a sample stream of the liquid discharged from the harvesting column through valve V1B flows through open valve V5 and branch tube 65 to the manifold pipe 69 to which the tube 16 of the analysis apparatus 60 is connected.

As in the case of the valves referred to above with reference to the fermentation tank, the valves V1 through V4, V1B through V4B and V5 through V8 are all solenoid valves which are spring closed when their respective solenoids are de-energized and are opened as a result of energization of their respective solenoids. A flow control switch 87 in the delivery pipe between the filter press 50 and the pump 54 controls the supply of current from the supply lines L1 and L2 to the electrically operated motors and devices associated with the columns C1 to C4. As hereinafter more particularly described, a time-delay device 90 is provided in the control circuit for delaying the analysis operation in respect to any adsorbent column for a predetermined period of time to allow the flow to be stabilized. It will be readily understood that while liquid is flowing into the manifold pipe 56 and through column C1 the recorder 60R of the analysis apparatus 60, said recorder being here represented diagrammatically displaced from the complete apparatus 60 for the purpose of illustration, is operated for indicating and recording the quantity of antibiotic material which is being wasted through discharge pipe 58.

When the stylus 92 of said recorder reaches a predetermined position, a normally closed switch 94 is opened and a normally open switch 96 is closed. When this happens, the relay 98 of a stepping switch is de-energized. More specifically, as here shown, the relay 98 is normally energized by a source of current, illustrated as a battery 99, when switch 94 is closed, the circuit being readily traced from one side of the battery through the winding of relay 98 through the switch 94, to the contact arm 100 through the first contact of the stationary contact segment 102 of the stepping switch and from the latter to the other side of the battery. The stepping switch also includes the contact arms 104 and 106 which are ganged by the link 108 for conjoint operation with each other and with the arm 100, and which coact with the contacts of the contact segments 110 and 112, respectively, of the stepping switch. The stepping switch is of a well known type which, in operation, advances the contact arms 100, 104 and 106 by an operating spring-actuated mechanism when the winding of the relay 98 is de-energized. This spring-actuating mechanism, as illustrated diagrammatically, comprising a spring 114 which is connected to the relay armature 116 and to a pawl 118 which operates a ratchet stepping wheel 120 for moving the contact arms one step each time the winding 98 of the relay is de-energized. The circuit of the paper feed drive of the recorder 60R and the circuit of relay 98 may be provided with normally open, electro-magnetically operated switches (not shown) which are closed under the control of relay K, in which case, the latter may be provided with an additional pair of normally open contacts which are closed when the relay K is energized. In such case, the paper feed drive and the stepping switch will be inactive until the harvesting operation begins.

Contacts numbered 1 to 4 of contact segment 112 of the stepping switch are connected to the solenoids of inlet valves V1 and V4 by the wires V1' through V4', respectively, and to the outlet valves V1B through V4B by the wires V1B' through V4B', respectively. The contact arm 106 of segment 112 is connected to line L2 of the source of current and thus connects one terminal of each of the solenoids of the inlet valves V1 through V4, respectively, and one terminal of the solenoids of the outlet valves V1B through V4B, to said line L2 according to the position of the arm 106 of the stepping switch. The other terminals of the solenoids are connected by wires 122 and 124 to the line L1A which is connected to one of the contacts of the flow switch 87, the other contact being connected to line L1 of the source of current. Thus it will be understood that when liquid is being pumped from the tank 10 the flow switch closes and completes a circuit from line L1 to line L1A and from the latter to wires 122 and 124 then through solenoids of the V1 and V1B valves according to the position of contact arm 106 of the stepping switch to open the corresponding valves.

The contacts of the segment 110 of the stepping switch are connected to the solenoids of valves V5 through V8 by the wires V5' through V8', respectively, to one terminal of each of said solenoids, respectively. The other terminals of the solenoids of valves V5 through V8 are connected by a wire 126 to line L1A, and through the contacts of the flow switch to line L1 of the source of current. The other line L2 of the said source of current is connected to the contact arm 104 of contact segment 110 by a wire 128 which is connected to one terminal 130 of the delay timer 90 and another terminal 132 of said delay timer is connected to line L2. As indicated by the dotted line 134, a circuit between terminals 130 and 132 is not completed until after a predetermined time delay according to the setting of the delay timer. The delay timer is operated under the control of the switch 96 of the analyzer recorder 60R, one contact of said switch is connected by wire 136 to line L2 and the other contact of said switch is connected by a wire 138 to a terminal 140 of timer 90. A companion terminal 142 of delay timer 90 is connected to line L1A of the flow switch and through the latter, when its contacts are closed, to line L1. Thus, when the contacts of switch 96 are closed by the movement of the stylus 92 of the recorder 60R to the predetermined adjusted position of switch 96 a circuit is completed from line L1 through the flow switch to line L1A and from the latter to terminal 142 through the electrical actuators of the delay timer and terminal 140, to switch 96 by wire 138 and from said switch by wire 136 to line L2. After a predetermined operation of the timer according to its setting, a circuit is completed across terminals 130 and 132 for completing a circuit through the solenoid of one of the valves V5 through V8 according to the position of contact arm 104, whereby said valve is opened for the passage of the sample liquid to the manifold 69 which is connected to the analysis apparatus 60. Accordingly, it will be observed that the valve which allows sample liquid to flow to the analysis apparatus is not opened until the flow of the liquid through the corresponding harvesting column begins and becomes stable before the analysis apparatus is set into operation, thus eliminating erratic traces on the record paper which might otherwise occur if the operation of the recorder were initiated immediately upon the commencement of the flow of the liquid through the adsorbent column. The delay timer is of the momentary start and reset type, and as timers of this type are well known and do not, per se, form part of the present invention, further description thereof is considered unnecessary. A timer of this type, which is presently preferred, is known as the "Eagle Cycleflex" reset timer and is readily available on the market.

The automatic operation of the apparatus described above with reference to FIG. 4 is believed to be clear from the above description. In summary, in the operation of said apparatus the analysis apparatus AA, is set into operation either at the commencement of the culture phase in tank 10 or at some latter time, according to preference. When the stylus of the recorder 46 reaches the position corresponding to the maximum yield point of the antibiotic material in the tank 10, relay K is energized as a result of the closing of the normally open switch 72. The closing of relay K results in the discontinuance of the heating of the contents of tank 10, and if desired a coolant may be supplied to the heating coil for preventing further or harmful action in said tank. At the same time, sulphuric acid is pumped into the tank and when the pH of the liquid reaches the predetermined value, valve 43 is opened and pumps 52 and 54 are set into operation for pumping the liquid from tank 10 to the manifold 56 of the harvesting apparatus. As soon as the liquid commences to flow to the harvesting apparatus the normally open flow switch 87 is closed and the liquid flows through the first adsorbent column C1, valves V1 and V1B having been in open condition, and the other valves V2, V3, V4 and V2B, V3B and V4B being closed. As soon as the flow through column C1 becomes stable, the time allowed for that purpose being determined by the setting of delay timer 90, valve V5 in the sample supply tube 65 is opened and the liquid passes to the analysis apparatus 60 for automatic analysis and for control of the analysis recorder 60R. When the stylus 92 of the recorder 60R reaches the position of normally closed switch 94, adjusted according to the maximum permissible waste of antibiotic material through pipe 58, the circuit through the winding of relay 98 of the stepping switch is interrupted and the contact arms 100, 104 and 106 which control of the operation of the solenoids of the valves associated with the several adsorbent columns, respectively, are moved in the direction of the arrows to the next contact of the respective switch contact segments, resulting in the de-energization of the solenoids of valves V1, V1B and V5 of harvesting column C1 and the closing of said valves, and the energization of valves V2 and V2B of the column C2 and after a time delay according to the setting of time 90, the energization of the solenoid of valve V6 in the sample supply line 66 so that the liquid that flows through the column C2 is subjected to analysis and results in the operation of the recorder 60R for transferring the flow to column C3 when the maximum permissible waste of antibiotic material through the discharge pipe 58 is reached. The same operation is then repeated for column C3 and column C4, assuming of course that the quantity of liquid in tank 10 is such as to require the illustrated number of columns for the harvesting for all of the antibiotic material produced in tank 10.

The automatic operation described above with reference to FIG. 4 of the drawings is applicable specifically to the production of streptomycin. In this connection it will be understood by those familiar with the production of antibiotics that in the case of streptomycin, acid is introduced into the fermentation tank for the purpose of facilitating the separation of the streptomycin from the mycelia to which the streptomycin adheres in the fermentation tank. The addition of the acid, as described above, results in the substantially complete separation of the streptomycin from the mycelia so that during the passage of the menstruum through the filter press the streptomycin passes through the filter and is not held back by the mycelia. In the case of penicillin, however, the acidification operation is unnecessary; accordingly, the control of the discharge of the menstruum from the fermentation tank for the production of penicillin is obtained directly from the recorder of the analysis apparatus, the pH recorder being omitted.

The present invention is not only useful for monitoring the culture phase and the adsorption process of the harvesting operation but is also highly useful for monitoring the second phase of the harvesting operation. More particularly, as is well known to those skilled in the art of production of antibiotics, after the adsorption phase of the harvesting operation, the elution phase of the harvesting operation is performed for removing the antibiotic material from the adsorption material in the several adsorption columns. This monitoring operation may be performed substantially in the same way as described above with reference to FIG. 3, except that in this phase of the harvesting operation the liquid for removing the antibiotic material from the adsorption columns is admitted to each column, one at a time, and the effluent liquid from the column is analyzed for ascertaining the concentration of the antibiotic therein. In particular, it is desirable that the concentration of the antibiotic in the effluent be maintained above a predetermined value in order to avoid excess dilution of the antibiotic-containing liquid discharged from the harvesting column, whereby to avoid dilution of the total production from the several columns. Accordingly, pursuant to this aspect of the present invention the analysis apparatus such as that indicated at 60 in FIG. 3 in conjunction with the tubes 65 to 68 is advantageously employed for furnishing an immediate indication of the concentration of the antibiotic in the effluent liquid so that as soon as the concentration drops below the predetermined value, the operation of that particular column may be discontinued by closing the associated valves and the next column put into operation by opening the associated valves. It will be understood that while in FIG. 3 the harvesting columns are shown connected to the manifold 56 which is supplied by liquid from the filter press, said manifold may be connected to a source of elution liquid and the fluid flow between the manifold and the pump 54 and pipe 64 may be cut off by closing valve 59a between the pump and the adjacent end of the manifold 56. It will be understood that the elution liquid may be admitted into manifold 56 at the end adjacent valve 59 thereof, from a suitable source (not shown) by opening valve 59.

In the above description it was also explained that air is pumped into the tube 30 (FIG. 1) or tube 30a (FIG. 2) for dividing the antibiotic-containing liquid stream into liquid segments separated by segments of air. By reason of the division of the liquid stream into comparatively small segments of liquid separated by segments of air, material in the streams which would otherwise adhere to the walls of the tubing is prevented by the action of the air segments from adhering to the walls of the tubing in the conduits, including the walls of the tubular conduit of the dialyzer. As illustrated, the pump 12 is also provided with a tube for the admission of air into the diffusate liquid supplied to the dialyzer into the tubes 38 and 38a, respectively. The air thus admitted into these tubes acts in the same way as the air admitted into tubes 30 and 30a, but since the liquids which flow to the tubes 38 and 38a, respectively, do not contain material which is as likely to adhere to the walls of the tubing as the material which flows in tubes 30 and 30a, the admission of air into tubes 38 and 38a may be dispensed with.

While I have shown and described the preferred embodiments of my invention, it will be understood that various changes may be made in the idea or principles of the invention within the scope of the appended claims.

Having thus described my invention, what I claim and desire to secure by Letters Patent is:

1. The method of monitoring the production of an antibiotic substance produced in a liquid in a tank, comprising withdrawing test samples of said liquid from the tank as the growth of the antibiotic substance proceeds therein, flowing the samples in the form of a stream together with a reagent therefor through a dialyzer at one side of the membrane thereof while a diffusate forming liquid stream flows through the dialyzer at the other side of the membrane, thereby obtaining a liquid diffusate of the derivative substance resulting from the treatment of the antibiotic substance with said reagent and representative of said antibiotic substance in proportion to the quantity of the antibiotic substance in the test samples, respectively, concurrently treating the diffusate for colorimetric analysis, and concurrently passing the treated diffusate through a flow-cell colorimeter for obtaining an indication of the growth progress of the antibiotic substance in said tank concurrently with the production thereof.

2. In the production of an antibiotic substance according to which the substance is grown in a fermentor tank containing a liquid and then harvested by treating the liquid containing the same in a harvesting tank, the method which comprises withdrawing test samples of the liquid from said fermentor tank as the growth of the antibiotic substance proceeds therein, flowing the samples in the form of a stream together with a reagent therefor through a dialyzer at one side of the membrane thereof, while a diffusate forming liquid stream flows through the dialyzer at the other side of the membrane, thereby obtaining a liquid diffusate of the derivative substance resulting from the treatment of the antibiotic substance with said reagent and representative of said antibiotic substance in proportion to the quantity of the antibiotic substance in the test samples, respectively, concurrently treating the diffusate for colorimetric analysis, and concurrently passing the treated diffusate through a flow-cell colorimeter for obtaining an indication of the growth progress of the antibiotic substance in said tank concurrently with the production thereof, and transferring the antibiotic-containing liquid from said fermentor tank to said harvesting tank near the time of maximum growth in said fermentor tank as shown by said concurrently obtained growth-progress indication.

3. In the production of an antibiotic substance according to which the substance is grown in a fermentor tank containing a liquid and then harvested by treating the liquid containing the same in a harvesting tank containing adsorbent material which removes the antibiotic substance from the liquid, the method which comprises withdrawing test samples of the liquid from said fermentor tank as the growth of the antibiotic substance proceeds therein, flowing the samples in the form of a stream together with a reagent therefor through a dialyzer at one side of the membrane thereof while a diffusate forming liquid stream flows through the dialyzer at the other side of the membrane, thereby obtaining a liquid diffusate of the derivative substance resulting from the treatment of the antibiotic substance with said reagent and representative of said antibiotic substance in proportion to the quantity of the antibiotic substance in the test samples, respectively, concurrently treating the diffusate for colorimetric analysis, and concurrently passing the treated diffusate through a flow-cell colorimeter for obtaining an indication of the growth progress of the antibiotic substance in said tank concurrently with the production thereof, transferring the antibiotic-containing liquid from said fermentor tank to said harvesting tank near the time of maximum growth in said fermentor tank as shown by said concurrently obtained growth-progress indication, flowing the liquid having antibiotic material separated therefrom out of said harvesting tank, separating test samples of said last-mentioned liquid as the harvesting process proceeds, flowing the last-mentioned samples together with a reagent therefor through a dialyzer at one side of the membrane thereof while a diffusate forming liquid flows through the dialyzer at the other side of the membrane, thereby obtaining a representative sample liquid capable of being analyzed for the presence of the antibiotic in proportion to the quantity thereof in the liquid flowing out of the harvesting tank, and concomitantly passing said last-mentioned representative sample liquid through a flow-cell colorimeter for analysis concomitantly with the flow of the liquid out of the harvesting tank.

4. The method of monitoring a process of producing an antibiotic substance in a liquid in which the quantity of the antibiotic substance varies as the process proceeds, comprising withdrawing test liquid as the process continues, transmitting said test liquid in the form of a stream and a reagent therefor through a dialyzer and concurrently forming a diffusate containing a derivative substance resulting from the effect of said reagent on said liquid and which is proportionately representative quantitatively of said antibiotic substance undergoing production in said first-mentioned liquid at the time of withdrawal, and analyzing said representative derivative substance to obtain a quantitative indication of the antibiotic substance under production in said liquid substantially concomitantly with said production at the time of the withdrawal of the test liquid.

5. The method of monitoring a process for the production of streptomycin in a fermentor tank, comprising pumping a test liquid from said tank while the process is in operation and concurrently pumping sodium hydroxide together with said test liquid through a heater for converting the streptomycin to maltol, and concurrently pumping the maltol-containing liquid from said heater through a dialyzer at one side of its diaphragm while pumping a liquid through the dialyzer at the other side of said diaphragm for forming a liquid diffusate containing some of said maltol in proportion to the quantity thereof contained in the liquid passing through the dialyzer at said one side of the diaphragm, and concurrently analyzing said liquid diffusate quantitatively in respect to its maltol content while said test liquid and said liquid diffusate are flowing, respectively, to and from the analyzer, and thereby concurrently obtaining a quantitative indication of the streptomycin in said test liquid during the production of said streptomycin.

6. The method of monitoring a process for the production of penicillin in a fermenter tank, comprising pumping from said tank, while the process is in operation, a test liquid together with sodium hydroxide through a conduit and thereby converting the penicillin in said test liquid to penicilloic acid, pumping the resulting liquid through a dialyzer at one side of its diaphragm while pumping a liquid through the dialyzer at the other side of said diaphragm for forming a liquid diffusate containing some of said penicilloic acid in proportion to the quantity thereof contained in the liquid passing through the dialyzer at said one mentioned side of the diaphragm, and concurrently analyzing said liquid diffusate quantitatively in respect to its penicilloic acid content while said test liquid and said liquid diffusate are flowing, respectively, to and from the dialyzer, and thereby concurrently obtaining a quantitative indication of the penicillin in said test liquid during the production of said penicillin.

7. The method of monitoring a process for the production of an antibiotic substance in a liquid in a tank, comprising conducting a test stream of said liquid through a conduit, simultaneously conducting through said conduit a stream of a liquid to mix with and modify said test liquid by converting the antibiotic substance therein into a substance separable from said test stream by dialysis and quantitatively representative of the antibiotic substance in the test stream, conducting the modified test stream and a liquid stream simultaneously through a dialyzer at opposite sides, respectively, of the diaphragm thereof and thereby forming a second test stream of liquid containing some of said representative substance, diffused therein through the diaphragm of the dialyzer, in a quantity proportional to the quantity of the antibiotic substance in the first-mentioned test stream, and analyzing said last-mentioned test stream during the flow thereof from the dialyzer for determining the quantity of said representative substance therein and thereby determining the quantity of antibiotic substance in said first-mentioned stream concurrently with the production of said antibiotic substance.

8. Apparatus of the character described, comprising the combination with a production tank in which an antibiotic substance contained in a liquid varies in quantity during its production, of automatic means for quantitatively monitoring the antibiotic substance in said liquid, comprising conduit means, means for conducting a test stream of said liquid containing said antibiotic substance through said conduit means, means for simultaneously introducing into said conduit means a stream of a liquid to mix with and modify said test liquid by converting the antibiotic substance therein into a substance separable from said test stream by dialysis and quantitatively representative of the antibiotic substance in the test stream, a dialyzer having a diaphragm, said dialyzer being connected to said conduit means at one side of said diaphragm for the passage of the modified test stream from said conduit means through the dialyzer at said one side of said diaphragm, means for simultaneously conducting a stream of liquid through said dialyzer at the other side of its diaphragm for forming a second test stream of liquid containing some of said representative substance, diffused therein through the diaphragm of the dialyzer, in a quantity proportional to the quantity of the antibiotic substance in the first-mentioned test stream, and means through which said last-mentioned stream flows for analyzing said last-mentioned test stream during the flow thereof from the dialyzer for determining the quantity of said representative substance therein and thereby determining the quantity of the antibiotic substance in said first-mentioned stream concurrently with the variation of the quantity of said antibiotic substance in said first mentioned liquid.

9. Apparatus of the character defined by claim 8, wherein means is provided in liquid flow communication with said tank for separating the antibiotic substance from said first mentioned liquid, and other monitoring means is provided operable to automatically analyze the spent liquid which has been separated from the antibiotic substance for ascertaining whether said spent liquid contains a quantity of the antibiotic substance in excess of a tolerance limit.

10. In apparatus including a tank containing a liquid for the production of a substance in said liquid which in its process of production progressively increases to a maximum quantity in said liquid and is thereafter subject to impairment if said process is not discontinued; automatic analysis means for quantitatively monitoring the substance in said tank, said analysis means being connected to said tank for receiving said liquid therefrom during the operation of said apparatus, and means connected with and automatically operable under the control of said analysis means for effecting a discontinuance of said process of production when the quantity of said substance increases to said maximum.

11. In apparatus including a tank containing a liquid for the production of a substance in said liquid which in its process of production progressively increases to a maximum quantity in said liquid, said apparatus including a heater for said liquid; automatic analysis means for quantitatively monitoring the substance in said tank, said analysis means being connected to said tank for receiving said liquid therefrom during the operation of said apparatus, and means connected with and automatically operable under the control of said analysis means for effecting a discontinuance of said process of production when the quantity of said substance increases to said maximum, said last-mentioned means comprising means for discontinuing the operation of said heater at said maximum quantity of said substance.

12. In apparatus including a tank containing a liquid for the production of a substance in said liquid which in its process of production progressively increases to a maximum quantity in liquid, said apparatus including means for effecting the discharge of the substance-containing liquid from said tank; automatic means for quantitatively monitoring the substance in said tank, said analysis means being connected to said tank for receiving said liquid therefrom during the operation of said apparatus, and means connected with and automatically operable under the control of said analysis means for operating said discharge means for the removal of said substance-containing liquid from said tank when the quantity of said substance in the tank increases to said maximum quantity.

13. Apparatus for monitoring a process of producing a substance in a liquid in which the yield of the substance increases as the process proceeds, comprising in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said part of the apparatus and to one side of said dialyzer for pumping said liquid through the dialyzer at said one side thereof, and pump means connected to said dialyzer at the other side thereof for pumping a liquid through the dialyzer at said other side thereof to receive by diffusion through the dialyzer membrane some of the substance contained in said first mentioned liquid, and means connected with and operable automatically in conjunction with said last-mentioned means for discontinuing said process when the yield of the substance reaches a predetermined amount.

14. Apparatus for monitoring a process of producing a substance in a liquid in which the yield of the substance increases as the process proceeds, comprising, in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said part of the apparatus and to one side of said dialyzer for pumping said liquid through the dialyzer at said one side thereof, and pump means connected to said dialyzer at the other side thereof for pumping a liquid through the dialyzer at said other side thereof to receive by diffusion through the dialyzer membrane some of the substance contained in said first mentioned liquid, means connected with and operable automatically in conjunction with said last-mentioned means for discontinuing said process when the yield of the substance reaches a predetermined amount, and means operable automatically in conjunction with said last-mentioned means for effecting a harvesting of the substance from said liquid and thereby separate the substance from said liquid.

15. Apparatus for monitoring a process of producing a substance in a liquid in which the yield of the substance increases as the process proceeds, comprising, in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said part of the apparatus and to one side of said dialyzer for pumping said liquid through the dialyzer at said one side thereof, and pump means connected to said dialyzer at the other side thereof for pumping a liquid through the dialyzer at said other side thereof to receive by diffusion through the dialyzer membrane some of the substance contained in said first mentioned liquid, colorimeter analysis apparatus of the continuous flow type, means for conducting said liquid diffusate to said colorimeter apparatus for analysis therein, said colorimeter analysis apparatus including a recorder, and means connected with and operable under the control of said recorder for terminating the operation of said process when the yield of the substance increases to a predetermined quantity.

16. Apparatus for monitoring a process of producing a substance in a liquid in which the yield of the substance increases as the process proceeds, comprising, in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said part of the apparatus and to one side of said dialyzer for pumping said liquid through the dialyzer at said one side thereof, and pump means connected to said dialyzer at the other side thereof for pumping a liquid through the dialyzer at said other side thereof to receive by diffusion through the dialyzer membrane some of the substance contained in said first mentioned liquid, colorimeter analysis apparatus of the continuous flow type, means for conducting said liquid diffusate to said colorimeter apparatus for analysis therein, said colorimeter analysis apparatus including a recorder, and means including an electric control relay operable under the control of said recorder for terminating the operation of said process when the yield of the substance increases to a predetermined quantity.

17. Apparatus for monitoring a process of producing a substance in a liquid in which the yield of the substance increases as the process proceeds, comprising, in combination with a part of the apparatus in which said substance is produced, a dialyzer, means operable in conjunction with said dialyzer to provide a liquid diffusate of a substance quantitatively proportional to said first-mentioned substance, said means comprising pump means connected to said part of the apparatus and to one side of said dialyzer for pumping said liquid through the dialyzer at said one side thereof, and pump means connected to said dialyzer at the other side thereof for pumping a liquid through the dialyzer at said other side thereof to receive by diffusion through the dialyzer membrane some of the substance contained in said first mentioned liquid, colorimeter analysis apparatus of the continuous flow type, means for conducting said liquid diffusate to said colorimeter apparatus, for analysis therein, said colorimeter analysis apparatus, including a recorder, and means including an electric control relay operable under the control of said recorder for terminating the operation of said process when the yield of the substance increases to a predetermined quantity, harvesting apparatus in liquid flow communication with said part of the apparatus for receiving the liquid, and means operable under the control of said relay for initiating the operation of said harvesting apparatus to separate the substance from the liquid.

18. Apparatus for monitoring a process of producing a substance in a liquid in which the yield of the substance increases as the process proceeds, comprising, in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said part of the apparatus and to one side of said dialyzer for pumping said liquid through the dialyzer at said one side thereof, and pump means connected to said dialyzer at the other side thereof for pumping a liquid through the dialyzer at said other side thereof to receive by diffusion through the dialyzer membrane some of the substance contained in said first mentioned liquid, colorimeter analysis apparatus of the continuous flow type operable in conjunction with said liquid diffusate, means connected with and operable under the control of said analysis apparatus for harvesting the substance from said first-mentioned liquid to thereby separate the substance therefrom, means for introducing a liquid into said part of the apparatus for preparing said first-mentioned liquid for harvesting the substance therefrom, and means operable under the control of said last-mentioned means for delivering said first-mentioned liquid from said production apparatus to said harvesting means for the harvesting operation.

19. Apparatus for monitoring a process of producing a substance in a liquid in which the yield of the substance increases as the process proceeds, comprising, in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said substance producing apparatus and to one side of said dialyzer for pumping said liquid through the dialyzer at said side thereof, and pump means connected to said dialyzer at the other side thereof to receive by diffusion through the dialyzer membrane some of the substance contained in said first mentioned liquid, colorimeter analysis apparatus operable in conjunction with said liquid diffusate, means operable under the control of said analysis apparatus for havesting the substance from said first-mentioned liquid, means for introducing a liquid into said part of the apparatus for preparing said first-mentioned liquid for harvesting the substance therefrom, said last-mentioned means including means responsive to the hydrogen ion concentration of said first-mentioned liquid and means operable under the control of said last-mentioned means for introducing acid into said first-mentioned liquid to adjust the hydrogen ion concentration thereof to a predetermined value.

20. Apparatus for monitoring a process of producing a substance in a liquid in which the yield of the substance increases as the process proceeds, comprising, in combination with a part of the apparatus in which said substance is produced, a dialyzer, and means operable in conjunction with said dialyzer to provide a liquid diffusate of a substance quantitatively proportional to said first-mentioned substance, said means comprising pump means connected to said substance producing apparatus and to one side of said dialyzer for pumping said liquid through the dialyzer at said side thereof, and pump means connected to said dialyzer at the other side thereof to receive by diffusion through the dialyzer membrane some of the substance contained in said first mentioned liquid, colorimeter analysis apparatus operable in conjunction with said liquid diffusate, means operable under the control of said analysis apparatus for harvesting the substance from said first-mentioned liquid, means for introducing a liquid into said part of the apparatus for preparing said first-mentioned liquid for harvesting the substance therefrom, said last-mentioned means including means responsive to the hydrogen ion concentration of said first-mentioned liquid and means operable under the control of said last-mentioned means for introducing acid into said first-mentioned liquid to adjust the hydrogen ion concentration thereof to a predetermined value, and means operable under the control of said last-mentioned means for delivering said first-mentioned liquid from said tank for the harvesting operation.

21. Apparatus of the character described, comprising a tank for liquid in which there is produced a substance according to a process in which the yield of said substance increases as the process proceeds, means including a dialyzer connected with said tank and operable in accordance with the yield of said substance for terminating said process when the yield of the substance reaches a predetermined amount, a plurality of harvesting columns, analysis means connected with and operable automatically in conjunction with said first mentioned means for delivering the liquid containing substance to one of said columns when the yield of the substance reaches said predetermined amount, and means connected with and operable under the control of said first column for transferring the delivery of the liquid containing substance from said tank to another one of said columns after a predetermined quantity is harvested by said first-mentioned column.

22. Apparatus of the character described, comprising a tank for liquid in which there is produced a substance according to a process in which the yield of said substance increases as the process proceeds, means including a dialyzer connected with said tank and operable in accordance with the yield of said substance for terminating said process when the yield of the substance reaches a predetermined amount, a plurality of harvesting columns, means operable automatically in conjunction with said first mentioned means for delivering the liquid containing substance to one of said columns when the yield of the substance reaches said predetermined amount, each of said columns including an adsorbent for some of said substance and a discharge for the non-adsorbed substance, and means connected with said discharge and operable under the control of said non-adsorbed substance discharged from one of said columns for transferring the delivery of the liquid containing substance from said tank to another one of said columns after a predetermined quantity is harvested by said one column to obtain said quantitative indication of said substance in said main stream of liquid during the flow thereof.

23. Apparatus of the character described, comprising a tank for liquid in which there is produced a substance according to a process in which the yield of said substance increases as the process proceeds, means including a dialyzer connected with said tank and operable in accordance with the yield of said substance for terminating said process when the yield of the substance reaches a predetermined amount, a plurality of harvesting columns, means operable automatically in conjunction with said first mentioned means for delivering the liquid containing substance to one of said columns when the yield reaches said predetermined amount, and means operable under the control of said one column for transferring the delivery of the liquid containing substance from said tank to another one of said columns after a predetermined quantity is harvested by said one column, said last-mentioned means including a dialyzer, means operable under the control of said dialyzer, and electrically operated valve means operable under the control of said dialyzer controlled means for controlling the delivery of said liquid containing substance to said harvesting columns, respectively.

24. Apparatus according to claim 23, provided with time delay means for delaying the operation of the last-mentioned dialyzer controlled means for a predetermined period of time at the start of the flow of the liquid through each of said columns, respectively, to allow said flow of the liquid to be stabilized.

25. Apparatus of the character described, comprising a tank for a liquid in which there is produced a substance according to a process in which the yield of said substance increases as the process proceeds, said tank having an outlet and a normally closed valve for controlling the delivery of said liquid from said tank through said outlet, means connected with said tank to receive liquid therefrom and operable automatically to quantitatively analyze the liquid in said tank, in respect to said substance, while the process is in operation, and means connected with and operable automatically under the control of said analyzing means to open said valve upon the production of a predetermined quantity of said substance in said tank.

26. Apparatus of the character described, comprising a tank for liquid in which there is produced a substance according to a process in which the yield of said substance increases as the process proceeds, said tank having an outlet and a normally closed valve for controlling the delivery of said liquid from said tank through said outlet, means having a branch connection with said tank and operable automatically to quantitatively analyze the liquid in said tank, in respect to said substance, while the process is in operation in said tank, a pH indicator connected with and operated under the control of said analyzing means when a predetermined quantity of the substance is produced in said tank, means operable under the control of said pH indicator to add a reagent to the liquid in the tank to adjust the pH of said liquid in the tank, and means operable under the control of said indicator to open said valve at a predetermined pH of said liquid.

27. The method of monitoring a liquid during the flow thereof for providing a quantitative indication of an antibiotic substance therein which is capable of diffusion through the membrane of a dialyzer, comprising the following steps in continuous sequence concurrently with the flow of the monitored liquid; withdrawing from the main stream of said liquid which contains said antibiotic substance a sample thereof in the form of a branch stream of said liquid, passing said branch stream of liquid through a dialyzer at one side of the membrane thereof, concurrently passing a second stream of liquid through the dialyzer at the other side of the membrane, to receive said substance diffused therein through the membrane of the dialyzer while said branch stream of liquid flows through the dialyzer, concurrently treating said second stream of liquid for colorimetric analysis in respect to the antibiotic substance received therein, and substantially concurrently passing said treated stream containing said antibiotic substance through a colorimeter for quantitative analysis in respect to said antibiotic substance therein.

28. Apparatus of the character described, comprising a dialyzer, means for pumping a stream of liquid from a liquid source through said dialyzer at one side of the membrane thereof, means for pumping a recipient liquid through said dialyzer at the other side of said membrane, a flow colorimeter connected to the outlet at said last mentioned side of the dialyzer, for colorimetrically analyzing the stream from said dialyzer, and means connected with and operable under the control of said colorimeter for subjecting said source liquid to a predetermined operation for changing a predetermined property thereof in response to the colorimetric analysis of said stream from the dialyzer.

29. The method of monitoring the production of an antibiotic substance of the group consisting of streptomycin and penicillin produced in a liquid in a tank, comprising withdrawing test samples of said liquid from the tank as the growth of the antibiotic substance proceeds therein, flowing the samples together with a reagent therefor through a dialyzer at one side of the membrane thereof while a diffsuate forming liquid flows through the dialyzer at the other side of the membrane, thereby obtaining a liquid diffusate of the derivative substance resulting from the treatment of the antibiotic substance with said reagent and representative of said antibiotic substance in proportion to the quantity of the antibiotic substance in the test samples, respectively, concurrently treating the diffusate for colorimetric analysis, and concurrently passing the treated diffusate through a flow-cell colorimeter for indicating the growth progress of the antibiotic substance in said tank during the production thereof.

30. The method of monitoring the production of an antibiotic substance of the group consisting of streptomycin and penicillin produced in a liquid in a tank, according to which there is employed analysis apparatus including a dialyzer and a flow-cell colorimeter; said method comprising, in concurrent relation, withdrawing a sample stream of the liquid from said tank, treating said liquid externally of said tank with sodium hydroxide, transmitting the treated liquid through one side of said dialyzer, transmitting a stream of liquid through the dialyzer at the other side thereof and thereby forming a diffusate of a substance in said treated liquid, treating said diffusate for colorimetric analysis in respect to said substance diffused therein from said treated liquid of said sample stream, and transmitting said treated diffusate to said colorimeter for analysis thereof in respect to said substance therein during the production of said antibiotic.

31. The method of monitoring a main stream of liquid during the flow thereof in a conduit for providing a quantitative indication of an antibiotic substance in said main stream, comprising the following steps performed in continuous sequence concurrently with the flow of said main stream; forming a branch stream of liquid containing said antibiotic substance from said main stream, treating the liquid in said branch stream for colorimetric analysis in respect to said antibiotic substance, and colorimetrically examining said treated liquid in respect to said antibiotic substance during the flow of said main stream.

32. The method of monitoring a main stream of liquid during the flow thereof in a conduit for providing a quantitative indication of an antibiotic substance in said main stream, comprising the following steps performed in continuous sequence concurrently with the flow of said main stream; forming a branch stream of liquid containing said antibiotic substance from said main stream, treating the liquid in said branch stream for colorimetric analysis in respect to said antibiotic substance, transmitting said treated liquid through the colorimeter, and operating a recorder under the control of the colorimeter in accordance with the response of the colorimeter to the treated liquid during the flow of said main stream.

33. The method of monitoring the production of an antibiotic substance of the group consisting of streptomycin and penicillin produced in a liquid in a tank, comprising the following steps performed in continuous sequence concurrently with the production of said antibiotic substance; withdrawing a test sample of said liquid from said tank in the form of a flowing stream, adding sodium hydroxide to said flowing stream of liquid, and heating said liquid stream and thereby forming a derivative of said antibiotic substance in a predetermined proportion to the proportion of said antibiotic substance in the liquid in said tank, treating the resulting liquid for colorimetric examination thereof in respect to said antibiotic derivative therein, and colorimetrically examining said stream containing said antibiotic derivative in respect to said derivative during the production of said antibiotic substance.

34. The method of monitoring the production of an antibiotic substance of the group consisting of streptomycin and penicillin produced in a liquid in a tank, comprising the following steps performed in continuous sequence concurrently with the production of said antibiotic substance; withdrawing a test sample of said liquid from said tank in the form of a flowing stream, adding sodium hydroxide to said flowing stream of liquid, and heating said liquid stream and thereby forming a derivative of said antibiotic substance in a predetermined proportion to the proportion of said antibiotic substance in the liquid in said tank, separating from said flowing stream a part of said antibiotic derivative in proportion to the quantity thereof in said flowing stream and simultaneously forming a second liquid stream containing said proportionate part of said antibiotic derivative, and quantitatively analyzing said last mentioned stream, during the flow thereof, in respect to said antibiotic derivative during the production of said antibiotic substance.

35. The method of monitoring the production of an antibiotic substance of the group consisting of streptomycin and penicillin produced in a liquid in a tank, comprising the following steps performed in continuous sequence concurrently with the production of said antibiotic substance; withdrawing a test sample of said liquid from said tank in the form of a flowing stream, adding sodium hydroxide to said flowing stream of liquid, and heating said liquid stream and thereby forming a derivative of said antibiotic substance in a predetermined proportion to the proportion of said antibiotic substance in the liquid in said tank, separating by dialysis from said flowing stream a part of said antibiotic derivative in proportion to the quantity thereof in said flowing stream and simultaneously forming a second liquid stream containing said proportionate part of said antibiotic derivative, and quantitatively analyzing said last mentioned stream, during the flow thereof, in respect to said antibiotic derivative during the production of said antibiotic substance.

36. Apparatus of the character described, comprising a dialyzer, means for pumping a stream of liquid from a liquid source through said dialyzer at one side of the membrane thereof, means for pumping a recipient liquid through said dialyzer at the other side of said membrane, a flow colorimeter connected to the outlet at said last mentioned side of the dialyzer for colorimetrically analyzing the stream from said dialyzer, and means connected with and operable under the control of said colorimeter for subjecting said source liquid to a predetermined operation for changing a predetermined property thereof in response to said colorimetric analysis, said last mentioned means including means for introducing a reagent into said source liquid to change said predetermined property thereof.

References Cited in the file of this patent

UNITED STATES PATENTS

| | | |
|---|---|---|
| 2,386,831 | Wright | Oct. 16, 1945 |
| 2,528,188 | Taylor | Oct. 31, 1950 |
| 2,797,149 | Skiggs | June 25, 1957 |

OTHER REFERENCES

Inskeep, Industrial and Engineering Chemistry, 43, No. 7, July 1951, pp. 1488–1498.

Nelson et al.: Industrial and Engineering Chemistry, 48, 1956, pp. 2183–2189.

Fuld et al.: Industrial and Engineering Chemistry, August 1957, vol. 49, No. 8 (rec'd. in Patent Office, Scientific Library on Aug. 9, 1957), pp. 1215–1220 (page 1220 relied on).

Autoanalyzer, T.M. 668,330, Oct. 14, 1958.